United States Patent [19]

Sekiya et al.

[11] Patent Number: 4,613,650

[45] Date of Patent: Sep. 23, 1986

[54] COPOLYMER LATEX

[75] Inventors: Masayoshi Sekiya, Tokyo; Toshiro Ishizuka, Yokosuka; Daiharu Maeda, Yokohama; Kenzo Miyamoto, Yokohama; Takahiro Shimazoe, Yokohama, all of Japan

[73] Assignee: Nippon Zeon Co., Ltd., Tokyo, Japan

[21] Appl. No.: 701,500

[22] Filed: Feb. 14, 1985

[51] Int. Cl.$^4$ .............................................. C08L 9/04
[52] U.S. Cl. ................................................... 524/828
[58] Field of Search ........................................ 524/828

[56] References Cited

U.S. PATENT DOCUMENTS

| | | | |
|---|---|---|---|
| 2,791,571 | 5/1957 | Wheelock et al. | 524/828 |
| 2,862,907 | 12/1958 | Stein et al. | 260/45.5 |
| 4,381,365 | 4/1983 | Mishiba et al. | 428/511 |

FOREIGN PATENT DOCUMENTS

| | | | |
|---|---|---|---|
| 0046320 | 2/1982 | European Pat. Off. | 524/828 |
| 57-117694 | 7/1982 | Japan | 524/828 |
| 58-187472 | 11/1983 | Japan | 524/828 |

*Primary Examiner*—Joseph L. Schofer
*Assistant Examiner*—N. Sarofim
*Attorney, Agent, or Firm*—Sherman and Shalloway

[57] ABSTRACT

A copolymer latex is produced by the emulsion polymerization of 20 to 50% by weight of a conjugated diolefin, 15 to 50% by weight of an aromatic vinyl compound, 0 to 25% by weight of a vinyl cyanide, 5 to 40% by weight of an alkyl ester of an unsaturated carboxylic acid, and 0.5 to 10% by weight of an ethylenically unsaturated acid. First, a monomeric mixture composed of the entire aromatic vinyl compound, the entire vinyl cyanide, at least a part of the conjugated diolefin and at least a part of the ethylenically unsaturated acid, and optionally at least a part of the alkyl ester of an unsaturated carboxylic acid, the amount of the monomeric mixture being 55 to 95% by weight based on the weight of all the monomers used in the process, is polymerized in emulsion. Then, the remainder of the monomers which amounts to 5 to 45% by weight of the weight of all the monomers is added to the above polymerization system and the mixture is polymerized in emulsion.

16 Claims, No Drawings

COPOLYMER LATEX

This invention relates to a copolymer latex, and a process for its production. More specifically, it relates to a copolymer latex capable of giving coated paper having good ink receptivity during multi-color printing by an offset printing technique, and to a process for its production.

In recent years, large quantities of pigment-coated paper and paperboards have been produced and used for printing and packaging purposes. The main purpose of pigment coating consists, in all cases, in increasing printing effects and merchandise values. The process of printing can roughly be classified as relief printing, offset printing and gravure printing, and the offset printing method is most generally used. It has gained increasing acceptance in recent years with wider use of offset printing on a rotary press.

Coated paper and paperboards for offset printing have been studied over many years in regard to base papers, coating compositions and coating methods, and various problems have been solved. The great problem still requiring a solution is the ink receptivity of such coated paper and paperboards during multi-color printing.

The ink receptivity during multi-color printing by the offset printing technique represents the state of transfer of ink to paper in the second and subsequent colors during multicolor printing. Since a coated paper or paperboard having poor ink receptivity permits only insufficient transfer of ink in the second and subsequent colors, the intended printing effect cannot be obtained, and the resulting print has a drastically reduced merchandise value. It is known that the water absorbability of paper greatly affects its ink receptivity in the second and subsequent colors in offset multicolor printing (to be simply referred to hereinafter as the ink receptivity). Specifically, with paper having poor water absorbability, the "dampening water" used in printing the first color remains on the paper surface, and transfer of an ink of the second color to the paper becomes poor.

The properties required of coated paper include adhesion strength, water resistance, gloss and printed gloss printing as well as ink receptivity. It is known that these properties are often contradictory to each other, and for example water resistance is inconsistent with ink receptivity and so is ink receptivity with printed gloss.

To increase the ink receptivity of coated paper, attempts have previously been made, for example, to (1) minimize the proportion of the binder for pigment binding, (2) use a non-platelike pigment and increase the ratio of voids among pigment particles, or (3) use a strongly hydrophilic pigment or binder. By using such means singly or in combination, coated papers for offset printing have been produced and used. Such coated papers, however, are by no means entirely satisfactory. These methods enhance the ink receptivity of coated paper, but at the sacrifice of other properties required of coated paper to some extent.

Carboxylated styrene/butadiene copolymer latices have previously been used for paper coating, but it is desired to improve them because of the problem described above. One attempt to achieve such an improvement is shown in U.S. Pat. No. 4,381,365 issued Apr. 26, 1983 (assigned to Sumitomo Naugatuck Co., Ltd.) which discloses a copolymer latex obtained by two-stage polymerization.

The copolymer latex of this U.S. Patent is obtained by a process for "copolymerization of an aliphatic conjugated diene monomer, an ethylenically unsaturated carboxylic acid monomer and a monolefinic monomer copolymerized with them in a weight proportion of 19.5–80:0.5–10:10–80, characterized in that (a) a mixture of the whole amount of the aliphatic conjugated diene monomer, the whole amount of the ethylenically unsaturated carboxylic acid monomer and a portion of the monoolefinic monomer, the combined amount of them being from 45 to 99% by weight on the basis of the total amount of the monomers to be used as the starting material, is subjected to emulsion polymerization (1st stage polymerization), and (b) after or while the remainder of the monolefinic monomer in an amount of from 1 to 55% by weight on the basis of the total amount of the said starting monomers is added thereto, further emulsion polymerization (2nd stage polymerization) is carried out".

However, the use of the copolymer latex obtained by this process still cannot give satisfactory ink receptivity, and it is still to be improved.

The present invention has been accomplished under the above-described background.

It is an object of this invention to provide a copolymer latex for paper coating capable of improving ink receptivity, water resistance, printed gloss, etc. of coated paper with good balance, and a process for its production.

Another object of this invention is to provide a paper coating composition comprising the copolymer latex and a pigment.

The copolymer latex meeting these objects can be produced by a process which comprises emulsion polymerizing 20 to 50% by weight of a conjugated diolefin, 15 to 50% by weight of an aromatic vinyl compound, 0 to 25% by weight of a vinyl cyanide, 5 to 40% by weight of an alkyl ester of an unsaturated carboxylic acid, and 0.5 to 10% by weight of an ethylenically unsaturated acid; wherein (a) first, a monomeric mixture composed of the entire aromatic vinyl compound, the entire vinyl cyanide, at least a part of the conjugated diolefin and at least a part of the ethylenically unsaturated acid, and optionally at least a part of the alkyl ester of an unsaturated carboxylic acid, the amount of the monomeric mixture being 55 to 95% by weight based on the weight of all the monomers used in the process, is polymerized in emulsion, and (b) then, the remainder of the monomers which amounts to 5 to 45% by weight of the weight of all the monomers is added to the above polymerization system and the mixture is polymerized in emulsion.

The characteristic feature of the present invention is that the polymerization is carried out in two steps as shown above.

Examples of the conjugated diolefin as one monomer used to produce the copolymer latex of the invention are 1,3-butadiene, 2-methyl-1,3-butadiene and 2-chloro-1,3-butadiene. Usually, the conjugated diolefin is used in an amount of 20 to 50% by weight based on the weight of all the monomers in order to give moderate flexibility to the resulting copolymer. If its amount is less than 20% by weight, the glass transition temperature of the copolymer becomes high and the copolymer has poor film formability. As a result, the resulting copolymer has reduced adhesion strength. If it exceeds 50% by weight, the water resistance and adhesion strength of the copolymer latex are degraded. The preferred amount of the conjugated diolefin is 25 to 45% by weight.

Examples of the aromatic vinyl compound as another monomer include styrene, alpha-methylstyrene and vinyltoluene. The aromatic vinyl compound is used generally in an amount of 15 to 50% by weight based on the total weight of the monomers, and is effective for imparting to the copolymer moderate hardness and also water resistance which is an important property in offset printing. If its amount is less than 15% by weight, the water resistance of the resulting copolymer is reduced. If it exceeds 50% by weight, the copolymer has reduced film formability and gives a coating of reduced adhesion strength. It is necessary to use the entire aromatic vinyl monomer in the first step of the polymerization. If it is used dividedly in both the first and second steps, the ink receptivity is reduced greatly. The preferred amount of the aromatic vinyl compound is 25 to 45% by weight.

Examples of the vinyl cyanide are acrylonitrile, methacrylonitrile and alpha-chloroacrylonitrile. The vinyl cyanide monomer gives moderate hardness to the copolymer and is effective for obtaining a good printed gloss, and the whole amount of it should be used in the first step. If it is used dividedly in the first and second steps, the ink receptivity is drastically reduced. The vinyl cyanide monomer is used generally in an amount of up to 25% by weight based on the weight of all the monomers. If it is used in an amount of more than 25% by weight, no improvement in printed gloss can be achieved, and the adhesion strength of the resulting copolymer is reduced. The preferred amount of the vinyl cyanide is 2 to 20% by weight.

Examples of the alkyl ester of an unsaturated carboxylic acid include methyl acrylate, methyl methacrylate, ethyl acrylate, ethyl methacrylate, butyl acrylate, 2-ethylhexyl acrylate, diethyl fumarate, dimethyl itaconate and monoethyl fumarate. This alkyl ester is used generally in an amount of 5 to 40% by weight based on the weight of all the monomers. It imparts moderate hardness to the copolymer and greatly increases ink receptivity. If its amount is less than 5by weight, the objects of this invention cannot be achieved. On the other hand, when it exceeds 40% by weight, a reduction in water resistance and adhesion strength results. The preferred amount of the alkyl ester is 8 to 35% by weight. Preferably, the alkyl ester of an unsaturated carboxylic acid is used dividedly in the first and second steps in view of ink receptivity.

The ethylenically unsaturated acid is an essential component for increasing the adhesion of the copolymer latex to pigments and base papers and improving the mechanical stability of the copolymer latex. This monomer is used generally in an amount of 0.5 to 10% by weight based on the weight of all the monomers. If its amount is less than 0.5% by weight, the aforesaid effects are difficult to obtain. If it exceeds 10% by weight, the resulting latex becomes alkali-sensitive, and gives rise to a problem in respect of workability. Moreover, the water resistance of the resulting copolymer is reduced. The preferred amount of this monomer is 1.5 to 8% by weight. Examples of the ethylenically unsaturated acid include not only unsaturated carboxylic acids such as acrylic acid, methacrylic acid, crotonic acid, cinnamic acid, itaconic acid, fumaric acid and maleic acid, but also monoalkyl esters of unsaturated dicarboxylic acids such as monoethyl itaconate, monobutyl fumarate and monopropyl maleate and unsaturated sulfonic acids such as 2-acrylamidopropanesulfonic acid, 1-sulfo-2-propyl acrylate, 2-sulfo-1-propyl methacrylate and styrenesulfonic acid. The unsaturated acid monomer may be used in the form of salts such as alkali metal and ammonium salts.

As required, a part of each of the aforesaid monomers may be replaced by another ethylenically unsaturated monomer copolymerizable with it in an amount of up to 10% by weight based on the total weight of the monomers. Specific examples of such other ethylenically unsaturated monomer are ethylenically unsaturated carboxylic acid amides and N-substituted products thereof, such as acrylamide, methacrylamide, N-methylolacrylamide and hydroxymethyldiacetone acrylamide, and functional ester compounds such as beta-hydroxyethyl acrylate, beta-hydroxyethyl methacrylate, hydroxybutyl methacrylate, di (ethylene glycol) maleate, glycidyl acrylate and glycidyl methacrylate.

In the first step of the process of this invention, 55 to 95% by weight, preferably 65 to 90% by weight, based on the weight of all the monomers, of a monomeric mixture composed of the whole amount of the aromatic vinyl compound, the whole amount of the vinyl cyanide, at least a part of the conjugated diolefin, at least a part of the ethylenically unsaturated acid and optionally at least a part of the alkyl ester of an unsaturated carboxylic acid is subjected to emulsion polymerization. If the amount of the monomeric mixture is less than 55% by weight, the resulting copolymer has poor water resistance, and if it exceeds 95% by weight, the ink receptivity is reduced. In the first step, the conversion of the monomers is preferably at least 60%. If it is less than 60%, the ink receptivity is inferior to that attained when it is at least 60%. In the second step, the remainder of the monomers in an amount of 5 to 45%, preferably 10 to 35%, by weight, based on the weight of all the monomers is added to the polymerization system, and the mixture is polymerized. There is no particular restriction on the mode of polymerization in the first and second steps, and it may be carried out batchwise, semibatchwise, or continuously. The polymerization temperature may be low or high. Emulsifiers, polymerization initiators, molecular weight controlling agents, etc. usually employed in emulsion polymerization may be used in this invention without any particular restriction.

As emulsifiers, there are used, for example, anionic surface-active agents such as higher alcohol sulfuric acid esters, alkylbenzenesulfonic acid salts and aliphatic sulfonic acid salts, nonionic surface-active agents such as alkyl esters, alkylphenyl ethers and alkyl ethers of polyethylene glycol, and amphoteric surface-active agents such as betaine-type compounds either singly or in combination. When the water resistance of the resulting copolymer latex is considered, the amount of the emulsifier used is preferably not more than 1 part by weight based on the weight of all the monomers. Water-soluble initiators such as potassium persulfate and ammonium persulfate, redox initiators, and oil-soluble initiators such as benzoyl peroxide can, for example, be used as the polymerization initiators. Mercaptans, xanthogen disulfides, and halogenated hydrocarbons, for example, may be used as the molecular weight controlling agents.

The copolymer latex of the invention so obtained can be used for preparing pigmented paper coating compositions containing conventional pigments. Examples of the pigments include kaolin, titanium dioxide, titanium white, barite, satin white, barium sulfate and calcium carbonate. There may also be added any conventional ingredients for coating compositions, for example co-binders such as starch, casein or polyvinyl alcohol, lubricants such as calcium stearate, ammonium stearate or wax emulsion, crosslinking agents such as formaldehyde, glyoxal, melamine-formaldehyde resin or urea-formaldehyde resin, alkali stabilizers, anti-foaming agents, and surface-active agents. The latex may be used in an amount of 2 to 50 parts by weight, preferably 3 to 40 parts by weight, as solids per 100 parts by weight of the pigment.

The copolymer latex of the invention may also find application in other uses than paper coating, for example in carpet backing.

The following examples illustrate the present invention more specifically. It should be noted however that the invention is in no way limited to these examples. All parts in these examples are by weight.

EXAMPLE 1

A pressure vessel having an inner capacity of about 1 liter was charged with 100 parts of water, 1.0 part of sodium dodecylbenzenesulfonate as an emulsifier, 0.5 part of sodium bicarbonate, 0.05 part of tetrasodium ethylenediaminetetraacetate as a chelating agent, 1.0 part of potassium persulfate as a polymerization initiator, the monomers for the first step indicated in Tables 1 and 2, and tertiary dodecylmercaptan and/or carbon tetrachloride as a molecular weight controlling agent, and the monomers were polymerized at 60° C. Then, the monomers for the second step indicated in Tables 1 and 2 were added, and the mixture was further subjected to emulsion polymerization. The polymerization conversion of the monomeric mixture at the time when the addition of the second-step monomers was started was as shown in the tables.

The resulting latices all had a conversion of at least 99%.

The latex obtained in each run was adjusted to pH 8 with sodium hydroxide after the unreacted monomers had been removed.

TABLE 1

| Monomers | Invention | | | | | | | Comparison | | | | | | |
|---|---|---|---|---|---|---|---|---|---|---|---|---|---|---|
| | 1 | 2 | 3 | 4 | 5 | 6 | 7 | A | B | C | D | E | F | G |
| First step (parts) | | | | | | | | | | | | | | |
| Butadiene | 28 | 23 | 34 | 19 | 38 | 26 | 30 | 28 | 25 | 34 | 35 | 20 | 32 | 38 |
| Styrene | 31 | 36 | 30 | 24 | 40 | 31 | 38 | 29 | 29 | 23 | 25 | 15 | 25 | 33 |
| Acrylonitrile | 10 | 8 | 10 | 8 | 5 | 9 | | 10 | 7 | 2 | 5 | 6 | 8 | |
| Methyl methacrylate | 8 | 6 | | 6 | 3 | 9 | 5 | 10 | 11 | 20 | 30 | 5 | | 5 |
| Itaconic acid | 3 | 5 | 2 | 3 | 4 | 3 | 4 | 3 | 3 | 3 | 5 | 2 | 5 | 5 |
| t-Dodecylmercaptan | | 0.2 | 0.1 | 0.3 | | | | 0.1 | | | | | 0.3 | |
| Carbon tetrachloride | 3 | | 2 | | 5 | 3 | 4 | 3 | 2 | 3 | 3 | 2 | | 4 |
| Total amount of the monomers | 80 | 79 | 76 | 60 | 90 | 78 | 77 | 80 | 75 | 82 | 100 | 50 | 70 | 81 |
| Polymerization conversion (%) | 78 | 81 | 80 | 70 | 93 | 65 | 82 | 79 | 83 | 76 | | 89 | 70 | 82 |
| Second step (parts) | | | | | | | | | | | | | | |
| Butadiene | 7 | 8 | 3 | 13 | 2 | 7 | 8 | 7 | 4 | 3 | | 16 | | |
| Styrene | | | | | | | | | 2 | 8 | | | 5 | 5 |
| Acrylonitrile | | | | | | | | | 3 | 6 | | | | |
| Methyl methacrylate | 12 | 12 | 19 | 25 | 7 | 14 | 14 | 10 | 16 | | | 32 | 25 | 14 |
| Itaconic acid | 1 | 1 | 2 | 2 | 1 | 1 | 1 | 1 | 2 | 1 | | 2 | | |
| t-Dodecylmercaptan | | 0.1 | | | 0.1 | | | 0.1 | | | | | | |
| Carbon tetrachloride | | | | | | 1 | 1 | | 2 | 1 | | 2 | | 1 |
| Total amount of the monomers | 20 | 21 | 24 | 40 | 10 | 22 | 23 | 20 | 25 | 18 | | 50 | 30 | 19 |

TABLE 2

| Monomers | Invention | | | | | | | Comparison | | | | | | | |
|---|---|---|---|---|---|---|---|---|---|---|---|---|---|---|---|
| | 8 | 9 | 10 | 11 | 12 | 13 | 14 | H | I | J | K | L | M | N | O |
| First step (parts) | | | | | | | | | | | | | | | |
| Butadiene | 28 | 27 | 21 | 40 | 30 | 25 | 33 | 15 | 50 | 27 | 22 | 28 | 30 | 25 | 45 |
| Styrene | 24 | 32 | 35 | 26 | 45 | 21 | 16 | 40 | 15 | 45 | 19 | 19 | 10 | 55 | 20 |
| Alpha-methylstyrene | 5 | | 2 | 4 | | | | 5 | | | | | | | 4 |
| Acrylonitrile | 10 | 8 | 10 | 5 | 5 | 20 | 8 | 15 | 5 | 10 | 5 | 30 | 15 | 2 | 5 |
| Methyl methacrylate | 8 | 2 | 8 | | 3 | 6 | 16 | 6 | | 1 | 20 | 2 | 15 | 2 | |
| Butyl acrylate | | 4 | | | | | | | | | | | | | |
| Itaconic acid | 2 | | 3 | | 3 | | 2 | 4 | | 4 | 3 | 3 | 4 | 2 | 1 |
| Acrylic acid | 2 | | | 3 | | | | | | | | | | | 3 |
| Methacrylic acid | | 4 | | | 4 | | 1 | | 3 | | | | | 1 | |
| Acrylamide | 2 | 1 | | | 1 | 1 | | 1 | | | | | | | |
| t-Dodecylmercaptan | | | 0.2 | 0.1 | | | 0.1 | | | | | | 0.2 | 0.2 | 0.1 |
| Carbon tetrachloride | 3 | 3 | | | 4 | 3 | 2 | 3 | 3 | 3 | 3 | 3 | | | |
| Total amount of the monomers | 81 | 78 | 79 | 78 | 88 | 72 | 76 | 81 | 78 | 87 | 69 | 82 | 74 | 87 | 78 |
| Polymerization conversion (%) | 75 | 78 | 73 | 80 | 74 | 81 | 77 | 80 | 76 | 77 | 81 | 79 | 79 | 75 | 80 |
| Second step (parts) | | | | | | | | | | | | | | | |
| Butadiene | 7 | 6 | 4 | 5 | 3 | 7 | 3 | 3 | 5 | 9 | 5 | 3 | 7 | 4 | |
| Alpha-methylstyrene | | | | | | | | | | | | | | | 6 |
| Methyl methacrylate | 7 | 14 | 15 | 10 | 9 | 14 | 15 | 15 | 16 | 3 | 25 | 14 | 14 | 8 | 10 |
| Butyl acrylate | 3 | | | 6 | | 5 | | | | | | | 6 | | |
| Itaconic acid | 1 | | 1 | | | 1 | | | | | 1 | 1 | 1 | | |
| Acrylic acid | | 1 | | | 1 | | | 1 | | | | | | | |
| Methacrylic acid | | | 1 | | | | 1 | | | | | | | 1 | |

TABLE 2-continued

| | Latex No. | | | | | | | | | | | | | | |
|---|---|---|---|---|---|---|---|---|---|---|---|---|---|---|---|
| | Invention | | | | | | | Comparison | | | | | | | |
| Monomers | 8 | 9 | 10 | 11 | 12 | 13 | 14 | H | I | J | K | L | M | N | O |
| Acrylamide | 1 | | 1 | | 1 | | 1 | | | | | | | | |
| t-Dodecylmercaptan | | | | 0.1 | | 0.1 | | | | | | | 0.1 | 0.1 | 0.1 |
| Carbon tetrachloride | | 1 | 1 | | | 1 | 1 | 1 | 1 | 1 | 1 | 1 | | | |
| Total amount of the monomers | 19 | 22 | 21 | 22 | 12 | 28 | 24 | 19 | 22 | 13 | 31 | 18 | 28 | 13 | 22 |

EXAMPLE 2

A paper coating composition having a solids concentration of 60% and a pH of 8.5 to 9.0 was prepared in accordance with the following recipe by using each of the latices shown in Table 1 of Example 1.

| Recipe | |
|---|---|
| Kaolin clay | 80 parts |
| Calcium carbonate | 20 |
| Dispersant | 0.3 |
| Sodium hydroxide | 0.2 |
| Modified starch | 6 |
| Copolymer latex | 12 |

The coating composition was coated by a blade coater on a base paper at a rate of 15±1 g/m² for each surface. Immediately after coating, the coated paper was dried with hot air at 130° C. for 30 seconds, and then moisture-conditioned for one day in a constant temperature-humidity chamber kept at 20° C. and 65% RH. The coated paper was then subjected to supercalendering twice at 60° C. under a linear pressure of 100 kg/cm.

The coated paper was tested for ink receptivity, dry pick, wet pick and printed gloss, and the results are shown in Table 3.

The same tests as above were conducted except that the latices shown in Table 2 of Example 1 were used. The results are shown in Table 4.

TABLE 3

| | Latex No. | | | | | | | | | | | | | |
|---|---|---|---|---|---|---|---|---|---|---|---|---|---|---|
| | Invention | | | | | | | Comparison | | | | | | |
| Properties | 1 | 2 | 3 | 4 | 5 | 6 | 7 | A | B | C | D | E | F | G |
| Ink receptivity (*1) | 4.5 | 4.3 | 4.3 | 4.7 | 4.5 | 4.2 | 4.7 | 3.8 | 3.9 | 3.0 | 3.5 | 3.7 | 3.0 | 3.3 |
| Dry pick (*2) | 4.6 | 4.5 | 4.6 | 4.4 | 4.7 | 4.5 | 4.5 | 4.4 | 4.1 | 4.5 | 4.3 | 4.5 | 4.3 | 4.5 |
| Wet pick (*3) | 4.5 | 4.5 | 4.7 | 4.3 | 4.4 | 4.6 | 4.5 | 4.2 | 4.5 | 4.7 | 4.4 | 4.3 | 4.3 | 4.0 |
| Printed gloss (*4) | 83 | 81 | 85 | 80 | 80 | 82 | 79 | 82 | 83 | 76 | 80 | 82 | 75 | 78 |

TABLE 4

| | Latex No. | | | | | | | | | | | | | | |
|---|---|---|---|---|---|---|---|---|---|---|---|---|---|---|---|
| | Invention | | | | | | | Comparison | | | | | | | |
| Properties | 8 | 9 | 10 | 11 | 12 | 13 | 14 | H | I | J | K | L | M | N | O |
| Ink receptivity | 4.5 | 4.7 | 4.8 | 4.4 | 4.2 | 4.6 | 4.8 | 4.7 | 4.5 | 3.5 | 4.6 | 3.8 | 4.2 | 4.4 | 3.0 |
| Dry pick | 4.6 | 4.4 | 4.2 | 4.8 | 4.5 | 4.3 | 4.5 | 2.5 | 4.5 | 4.3 | 4.1 | 3.8 | 4.2 | 3.0 | 4.6 |
| Wet pick | 4.2 | 4.5 | 4.7 | 4.0 | 4.8 | 4.6 | 4.3 | 3.0 | 2.8 | 4.6 | 3.1 | 4.0 | 2.7 | 3.2 | 4.0 |
| Printed gloss | 83 | 81 | 80 | 79 | 79 | 85 | 83 | 72 | 74 | 82 | 77 | 84 | 80 | 78 | 73 |

The above properties (*1) to (*4) were tested by the following methods.

(*1): Ink receptivity

Measured by using an RI tester (produced by Akira Seisakusho).

Water was coated on the coated paper sample by a molten roll, and solid printing was performed on it by an offset printing black ink under conditions which did not induce picking. The receptivity of the ink (the density of the ink) was observed with the naked eyes. The result was evaluated on a 5-point scale in which 5 represents "excellent" and 1, "poor".

(*2): Dry pick

Measured by using an RI tester.

Overprinting was performed six times on the coated paper sample by using an offset ink (high tack). The degree of paper picking was observed with the naked eyes, and evaluated on a 5-point scale as in (*1).

(*3): Wet pick

Measured by using an RI tester.

Water was coated on the coated paper sample by means of a moistened molten roll. Solid printing was performed on the sample with an offset ink (high tack). The degree of pigment picking was observed with the naked eyes, and evaluated on a 5-point scale as in (*1).

(*4): Gloss on printing (%)

Measured by using an RI tester.

Solid printing was performed on the coated paper sample with 0.4 cc of an offset ink. The printed sample was left to stand for one day in a constant temperature-humidity chamber kept at 20° C. and 65% RH, and the reflectance at an angle of 75°-75° as measured.

Tables 3 and 4 demonstrate that the samples in accordance with this invention had excellent ink receptivity and a good balance among adhesion strength, water resistance and printed gloss. On the other hand, it is seen from these tables that comparative samples outside the scope of the invention did not have satisfactory properties for coated papers offset printing in regard to ink receptivity, adhesion strength, water resistance and printed gloss.

EXAMPLE 3

Copolymer latices were prepared in the same way as in Example 1 except that the compositions of the monomers and the molecular weight controlling agents were changed as shown in Table 5.

TABLE 5

| | Latex No. | | | | | | | |
|---|---|---|---|---|---|---|---|---|
| | Invention | | | | Comparison | | | |
| Monomer | 15 | 16 | 17 | 18 | P | Q | R | S |
| First step (parts) | | | | | | | | |
| Butadiene | 25 | 20 | 40 | 24 | 20 | 27 | 25 | 30 |
| Styrene | 28 | 23 | 22 | 27 | 25 | 24 | 19 | 30 |
| Alpha-methylstyrene | | 5 | | | | | | 9 |
| Acrylonitrile | 12 | 18 | 20 | 3 | 5 | 1 | 10 | 8 |
| Methyl methacrylate | 8 | 4 | | 10 | 20 | 10 | 30 | 18 |
| Butyl acrylate | | | | | | | | |
| Itaconic acid | 4 | 2 | 4 | 3 | 4 | | 3 | 2 |
| Methacrylic acid | | 2 | | | | 4 | 1 | 2 |
| Methacrylamide | 1 | | 1 | | 1 | | | 1 |
| t-Dodecylmercaptan | 1.2 | | 1.0 | 0.8 | | 1.0 | 1.4 | 1.0 |
| Diisopropyl xanthogen disulfide | | 1.5 | 1.0 | | 1.5 | | | |
| Carbon tetrachloride | 4 | | | 3 | | | 4 | 2 |
| Total amount of monomers | 78 | 74 | 87 | 67 | 75 | 66 | 88 | 100 |
| Polymerization conversion (%) | 81 | 79 | 77 | 83 | 80 | 78 | 84 | |
| Second step (parts) | | | | | | | | |
| Butadiene | 8 | 5 | 3 | 6 | 5 | 6 | 3 | |
| Styrene | | | | | 5 | | 6 | |
| Alpha-methylstyrene | | | | | | | 2 | |
| Acrylonitrile | | | | | | 3 | | |
| Methyl methacrylate | 13 | 20 | 9 | 21 | 13 | 24 | | |
| Butyl acrylate | | | | 4 | | | | |
| Itaconic acid | 1 | | | 1 | 1 | | 1 | |
| Methacrylic acid | | 1 | | 1 | | 1 | | |
| Methacrylamide | | | 1 | | 1 | | | |
| t-Dodecylmercaptan | 0.3 | | 0.3 | 0.5 | | 0.5 | 0.1 | |
| Diisopropyl xanthogen disulfide | | 0.5 | 0.3 | | 0.5 | | | |
| Carbon tetrachloride | 1 | | | 2 | | | 1 | |
| Total amount of the monomers | 22 | 26 | 13 | 33 | 25 | 34 | 12 | |
| Amount of gel (%) | 40 | 38 | 45 | 43 | 44 | 36 | 39 | 50 |

The amount of a gel shown in Table 5 was measured as follows: The copolymer latex was let flow onto a glass plate and air-dried at room temperature to form a film. The film was divided into square pieces having each side measuring about 2 mm. About 0.5 g of the film pieces were weighed, and put in a cage of a stainless steel gauze with a size of 100 mesh. The cage was immersed in about 100 cc of tetrahydrofuran. Twenty-four hours later, the insoluble portion (dried) was precisely weighed, and the measured weight was indicated as the percent of the weight of the film before immersion.

EXAMPLE 4

A paper coating composition was prepared in the same way as in Example 2 using each of the latices prepared in Example 3.

By using the paper coating composition, both a one-surface coated paper sample and a two surface-coated paper sample (amount of coating 15±1 g/m²) for measuring blister resistance were prepared. The results of measurement are shown in Table 6.

TABLE 6

| | Latex No. | | | | | | | | |
|---|---|---|---|---|---|---|---|---|---|
| | Invention | | | | Comparison | | | | Invention |
| Properties | 15 | 16 | 17 | 18 | P | Q | R | S | 1 |
| Ink receptivity | 4.7 | 4.6 | 4.3 | 4.8 | 3.5 | 3.7 | 3.8 | 3.6 | 4.5 |
| Dry pick | 3.8 | 3.7 | 4.0 | 3.6 | 3.5 | 3.7 | 3.6 | 3.6 | 4.6 |
| Wet pick | 4.8 | 4.3 | 4.5 | 4.9 | 4.5 | 4.2 | 4.7 | 4.6 | 4.5 |
| Printed gloss | 81 | 83 | 80 | 83 | 78 | 81 | 82 | 79 | 83 |
| Blister resistance (°C.) (*5) | 220 | 220 | 210 | 230 | 230 | 210 | 220 | 220 | 170 |

(*5): Blister resistance

Measured by using a test sample prepared in accordance with TAPPI Standard T-526.

The test sample was immersed for about 3 seconds in a silicone oil bath kept at various temperatures, and the lowest temperature at which blisters occurred on the test sample was measured.

This Example demonstrates the advantage of the copolymer latex of this invention as a binder for preparation of coated paper used for offset rotary printing. The blister resistance is an important property of the coated paper used for offset rotary printing, and various techniques have been published in the past for imparting blister resistance. The present Example used a technique of decreasing the amount of gel by using a relatively large amount of the molecular weight controlling agent (see the gel amount data in Table 5). It is seen from Table 6 that all samples in accordance with this invention have excellent ink receptivity and possess blister resistance with a good balance with other properties, whereas the comparative samples outside the scope of the invention evidently have poor ink receptivity.

What is claimed is:

1. A process for producing a copolymer latex which comprises emulsion polymerizing 20 to 50% by weight of a conjugated diolefin, 15 to 50% by weight of an aromatic vinyl compound, 0 to 25% by weight of a vinyl cyanide, 5 to 40% by weight of an alkyl ester of an unsaturated carboxylic acid, and 0.5 to 10% by weight of an ethylenically unsaturated acid; wherein (a) first, a monomeric mixture composed of the entire aromatic vinyl compound, the entire vinyl cyanide, at least a part of the conjugated diolefin, at least a part of the ethylenically unsaturated acid, and 0-100% of the alkyl ester of an unsaturated carboxylic acid, the amount of the monomeric mixture being 55 to 95% by weight based on the weight of all the monomers, is polymerized in emulsion, and
   (b) then, the remainder of the monomers which amounts to 5 to 45% by weight of the weight of all the monomers is added to the above polymerization system and the mixture is polymerized in emulsion.

2. The process of claim 1 wherein the emulsion polymerization of step (b) is carried out when the conversion of the monomeric mixture in step (a) has reached at least 60%.

3. The process of claim 1 wherein the amount of the monomeric mixture to be polymerized in step (a) is 65 to 90% by weight based on the weight of all the monomers.

4. A copolymer latex produced by the process of claim 1.

5. A paper coating composition comprising the copolymer latex of claim 4 and a pigment.

6. The process of claim 1 wherein the vinyl cyanide is added in the amount of 2-20% by weight based on the weight of all the monomers.

7. The process of claim 1 wherein the conjugated diolefin is selected from the group consisting of 1, 3-butadiene, 2-methyl-1, 3-butadiene and 2-chloro-1, 3-butadiene.

8. The process of claim 1 wherein the aromatic vinyl compound is selected from the group consisting of sytrene, alpha-methylstyrene and vinyltoluene.

9. The process of claim 6 wherein the vinyl cyanide is selected from the group consisting of acrylonitrile, methacrylonitrile and alpha-chloracrylonitrile.

10. The process of claim 1 wherein the alykl ester of unsaturated carboxylic acid is selected from the group consisting of methyl acrylate, methyl methacrylate, ethyl acrylate, ethyl methacrylate, butyl acrylate, 2-ethylhexyl acrylate, diethyl fumarate, dimethyl itaconate and monoethyl fumarate.

11. The process of claim 1 wherein the ethylenically unsaturated acid is selected from the group consisting of acrylic acid, methacrylic acid, crontonic acid, cinnamic acid, itaconic acid, fumaric acid, maleic acid, monoethyl itaconate, monobutyl fumarate, monopropyl maleate, 2-acrylamidopropanesulfonic acid, 1-sulfo-2propyl acrylate, 2-sulfo-1-propyl methacrylate and styrene sulfonic acid.

12. The process of claim 1 wherein the ethylenically unsaturated acid monomer is in the form of the free acid or salt thereof.

13. The process of claim 1 which further comprises another ethylenically unsaturated monomer copolymerizable with said monomers in an amount of up to ten percent by weight based on the total weight of the monomers.

14. The process of claim 13 wherein said other monomer is selected from the group consisting of ethylenically unsaturated carboxylic acid amides, N- substituted products thereof and functional ester compounds.

15. The paper coating composition of claim 5 wherein said copolymer latex is used in an amount of 2-50 parts by weight as solids per 100 parts by weight of said pigment.

16. The paper coating composition of claim 1, wherein a portion of the alkyl ester is added in each of steps (a) and (b).

* * * * *

UNITED STATES PATENT AND TRADEMARK OFFICE
CERTIFICATE OF CORRECTION

PATENT NO. : 4,613,650
DATED : September 23, 1986
INVENTOR(S) : MASAYOSHI SEKIYA, ET AL.

It is certified that error appears in the above—identified patent and that said Letters Patent is hereby corrected as shown below:

IN THE CLAIMS

Claim 11, line 3, (column 12, line 17),
delete "crontonic",
insert --crotonic--.

Claim 11, line 6, (column 12, line 20),
delete "2pro",
insert --2-pro--.

Signed and Sealed this
Second Day of December, 1986

Attest:

DONALD J. QUIGG

Attesting Officer

Commissioner of Patents and Trademarks